United States Patent
Galatenko et al.

(10) Patent No.: US 7,401,313 B2
(45) Date of Patent: Jul. 15, 2008

(54) METHOD AND APPARATUS FOR CONTROLLING CONGESTION DURING INTEGRATED CIRCUIT DESIGN RESYNTHESIS

(75) Inventors: Alexei V. Galatenko, Moscow (RU); Elyar E. Gasanov, Moscow (RU); Iliya V. Lyalin, Moscow (RU)

(73) Assignee: LSI Corporation, Milpitas, CA (US)

( * ) Notice: Subject to any disclaimer, the term of this patent is extended or adjusted under 35 U.S.C. 154(b) by 260 days.

(21) Appl. No.: 11/258,738

(22) Filed: Oct. 26, 2005

(65) Prior Publication Data

US 2007/0094631 A1   Apr. 26, 2007

(51) Int. Cl.
*G06F 17/50* (2006.01)
*G06F 7/00* (2006.01)

(52) U.S. Cl. .......................... 716/12; 716/18
(58) Field of Classification Search ............. 716/1, 716/12, 18; 707/7, 100
See application file for complete search history.

(56) References Cited

U.S. PATENT DOCUMENTS

| | | | |
|---|---|---|---|
| 6,068,602 A * | 5/2000 | Tham et al. | 600/533 |
| 6,123,736 A * | 9/2000 | Pavisic et al. | 716/2 |
| 6,405,358 B1 * | 6/2002 | Nuber | 716/12 |
| 6,470,487 B1 | 10/2002 | Zolotykh et al. | 716/18 |
| 6,536,028 B1 * | 3/2003 | Katsioulas et al. | 716/17 |
| 6,543,032 B1 | 4/2003 | Zolotykh et al. | 716/2 |
| 6,564,361 B1 | 5/2003 | Zolotykh et al. | 716/8 |
| 6,618,846 B2 * | 9/2003 | Cheng | 716/5 |
| 6,681,373 B1 | 1/2004 | Zolotykh et al. | 716/2 |
| 7,076,406 B1 * | 7/2006 | Tetelbaum | 703/2 |
| 7,155,697 B2 * | 12/2006 | Teig et al. | 716/13 |
| 7,225,116 B2 * | 5/2007 | Harn | 703/14 |
| 2003/0182649 A1 * | 9/2003 | Harn | 716/11 |
| 2005/0229137 A1 * | 10/2005 | Ito | 716/12 |

* cited by examiner

*Primary Examiner*—Stacy Whitmore
(74) *Attorney, Agent, or Firm*—Westman, Champlin & Kelly, P.A.

(57) ABSTRACT

The present disclosure is directed to a method and apparatus for dividing an integrated circuit design field into a plurality of congestion rectangles having user-selectable sizes. A routing congestion value is estimated for each congestion rectangle prior to routing interconnections within the design field. The congestion values are stored in machine-readable memory and are updated in response to wire changes within the design field.

17 Claims, 7 Drawing Sheets

```
if new_value < cong_border_1
| then penalty = 0.0
else if new_value <= initial_value then
| penalty = new_value - max (cur_value, cong_border_1)
else // new_value > initial_value
| if new_value <= cong_border_2 then
| | if cur_value <= cong_border_1 then
| | | if initial_value <= cong_border_1 then
| | | | penalty = (new_value - cong_border_1) *
| | | |    cong_efficiency_multiplier
| | | else
| | | | penalty = (new_value - initial_value) *
| | | |    cong_efficiency_multiplier +
| | | |    initial_value - cong_border_1
| | | endif
| | else // cur_value > cong_border_1
| | | if cur_value < initial_value
| | | | penalty = (new_value - initial_value) *
| | | |    cong_efficiency_multiplier +
| | | |    initial_value - cur_value
| | | else
| | | | penalty = (new_value - cur_value) *
| | | |           cong_efficiency_multiplier
| | | endif
| | endif
| else // new_value > cong_border_2
| | penalty = cong_worst_penalty
| endif
endif
```

FIG. 5

```
if cur_value <= cong_border_1
| penalty = 0
else
| if cur_value <= initial_value
| | if new_value <= cong_border_1
| | | penalty = -(cur_value - cong_border_1)
| | else
| | | penalty = -(cur_value - new_value);
| | endif
| else // cur_value > initial_value
| | if cur_value <= cong_border_2
| | | if new_value <= cong_border_1
| | | | if initial_value <= cong_border_1
| | | | | penalty = -(cur_value - cong_border_1) *
| | | | |         cong_efficiency_multiplier
| | | | else
| | | | | penalty = -((val_c – initial_val) *
| | | | |         cong_efficiency_multiplier +
| | | | |         initial_val – cong_border_1)
| | | | endif
| | | else //new_value > cong_border_1
| | | | if new_value < initial_value
| | | | | penalty = -((cur_value - initial_value) *
| | | | |            cong_efficiency_multiplier +
| | | | |            initial_value - new_value);
| | | | else
| | | | | penalty = -(cur_value - new_value) *
| | | | |            cong_efficiency_multiplier
| | | | endif
| | | endif
| | else // cur_value > cong_border_2
| | |     // this situation is possible: changing back after
| | |     // disallowed modification
| | | penalty = 0
| | endif
| endif
endif
```

FIG. 6

METHOD AND APPARATUS FOR CONTROLLING CONGESTION DURING INTEGRATED CIRCUIT DESIGN RESYNTHESIS

FIELD OF THE INVENTION

The present disclosure relates to designing integrated circuits. More particularly, the present disclosure relates to a method and apparatus for controlling routing congestion design resynthesis.

BACKGROUND OF THE INVENTION

Semiconductor integrated circuits are traditionally designed and fabricated by first preparing a schematic diagram or hardware description language (HDL) specification of a logical circuit in which functional elements are interconnected to perform a particular logical function. The schematic diagram or HDL specification is then synthesized into cells of a cell library, the cells are placed in a layout pattern and interconnections are routed along predetermined routing layers. Once the final design has been completed, the resulting netlist, cell layout definitions, placement data and routing data together form an integrated circuit layout definition, which can be used to fabricate the integrated circuit.

Logic resynthesis refers to steps that can be performed during the design process to optimize one or more design characteristic, such as timing. For example, resynthesis can be used to optimize logic trees, large trees of buffers and inverters, cell types and placement. Resynthesis can be performed on local and global levels.

Throughout the resynthesis process, the integrated circuit design is changed step by step, by applying procedures of local optimization.

Many of the resynthesizing steps, such as design restructuring, can be performed prior to routing. However due to the large number of interconnections, or "nets", in a typical design, this restructuring can have a great effect on routing congestion in certain areas of the chip. This can complicate the routing process.

Limiting or controlling routing congestion during logic resynthesis would therefore be beneficial.

SUMMARY OF THE INVENTION

One embodiment of the present invention is directed to a method implemented at least in part by a computing device. The method includes: (a) dividing an integrated circuit design field into a plurality of congestion rectangles; (b) estimating a routing congestion value for each congestion rectangle prior to routing interconnections within the design field; (c) storing the congestion values in machine-readable memory; and (d) updating the routing congestion values in response to wire changes within the design field.

Another embodiment of the present invention is directed to a computer-readable medium having computer-executable instructions for performing steps comprising: (a) dividing an integrated circuit design field into a plurality of congestion rectangles; (b) estimating a routing congestion value for each congestion rectangle prior to routing interconnections within the design field; (c) storing the congestion values in machine-readable memory; and (d) updating the routing congestion values in response to wire changes within the design field.

Another embodiment of the present invention is directed to an apparatus. The apparatus includes a static congestion table having an estimated initial routing congestion value for each congestion rectangle of an integrated circuit design field, prior to routing. The apparatus also includes a dynamic congestion table for each logic transformation thread of a multi-threaded resynthesis process. Each dynamic congestion table includes an estimated dynamic routing congestion value for each of the congestion rectangles, prior to routing.

BRIEF DESCRIPTION OF THE DRAWINGS

FIG. 5 is a diagram illustrating pseudocode for calculating a penalty when a new wire is added to the design field.

FIG. 6 is a diagram illustrating pseudocode for an algorithm used to calculate a penalty for removing a wire from the design field.

DETAILED DESCRIPTION OF ILLUSTRATIVE EMBODIMENTS

Figure 1:
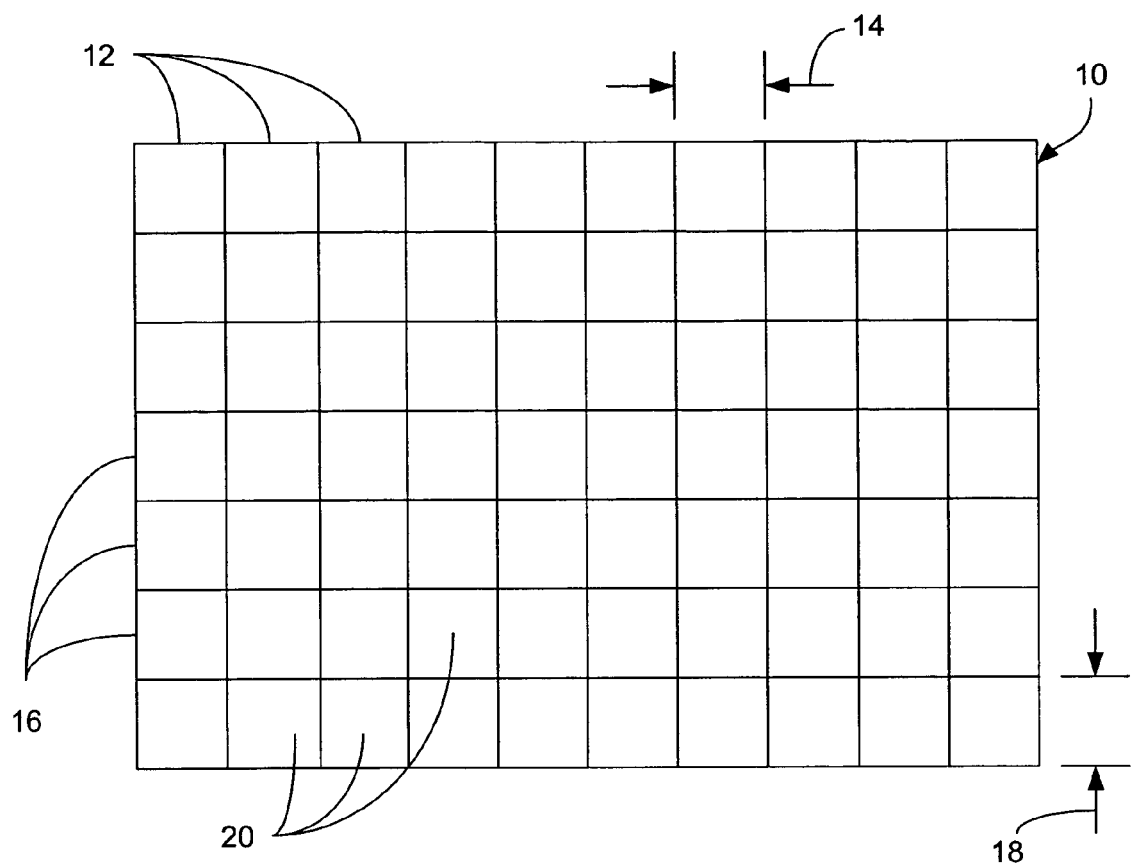
FIG. 1 is a diagram illustrating a design field of an integrated circuit design.

This disclosure relates to a method and apparatus for limiting or controlling routing congestion during design restructuring, and other design stages, when routing information is limited or unavailable. To limit congestion, an embodiment of the invention estimates and controls future wire density during design restructuring to ease the routing procedure.

1. General Design Flow

Semiconductor integrated circuits are traditionally designed and fabricated by first preparing a schematic diagram or hardware description language (HDL) specification of a logical circuit in which functional elements are interconnected to perform a logical function. The schematic diagram or HDL specification is then synthesized into cells of a cell library.

Each cell corresponds to a logical function unit, which is implemented by one or more transistors that are optimized for the cell. The logic designer or the computer-aided design tool selects the cells according to the number of loads that are attached to the cell, as well as an estimated interconnection required for routing. The cells in the cell library are defined by cell library definitions. Each cell library definition includes cell layout definitions and cell characteristics. The cell layout definition includes a layout pattern of the transistors in the cell, geometry data for the cell's transistors and cell routing data. The cell characteristics include a cell propagation delay and a model of the cell's function. The propagation delay is a function of the internal delay and the output loading (or "fan-out") of the cell.

A series of further computer-aided design tools generates a netlist from the schematic diagram or HDL specification of the selected cells and the interconnections between the cells. The netlist is used by a floor planner or placement tool to place the selected cells at particular locations in an integrated circuit layout pattern. The interconnections between the cells are then routed along predetermined routing layers.

Each interconnection is known as a "net". A net is a set of two or more pins, which must be connected. Because a typical chip has thousands, tens of thousands, or hundreds of thousands of pins, which must be connected in various combinations, the netlist includes definitions of thousands, tens of thousands, or hundreds of thousands of nets, or sets of pins. All the pins of a net must be connected. A typical net is defined by one or more conductive segments that are routed along one or more of the routing layers and are connected by vias between the layers. Each layer has a plurality of routing channels along which conductive segments are routed.

Once the netlist is created, the design tools determine the output loading of each cell as a function of the number of loads attached to each cell, the placement of each cell and the routed interconnections.

A timing analysis tool can be used to identify timing violations within the circuit. The time it takes for a signal to travel along a particular path or net from one element to another depends on the number of cells in the path, the internal cell delay, the number of loads attached to the cells in the path, the length of the routed interconnections in the path and the drive strengths of the transistors in the path.

A timing violation may be caused by a number of factors. For example, a particular cell may not have a large enough drive strength to drive the number of loads that are attached to that cell. Also, exceptionally long routing paths may cause timing violations. Timing violations are eliminated by making adjustments at each stage in the layout process. For example, the logic diagram can be changed to restructure certain sections of logic to improve timing through that section. In addition, an under-driven cell may be fixed by changing the logic diagram to include a cell having a larger drive strength. An exceptionally long routing path can be corrected by adjusting the placement of the cells. Other changes can also be made.

Once the timing violations have been corrected, the netlist, the cell layout definitions, the placement data and the routing data together form an integrated circuit layout definition, which can be used to fabricate the integrated circuit.

Many variations of the general integrated design flow exist and can be implemented with one or more embodiments of the present invention. Also, the particular steps or order of steps can be varied as desired.

2. Design Restructuring

Logic resynthesis refers to steps taken to optimize, or improve, one or more characteristics of the design, such as ramp time violations, timing and area. Ramp time optimization generally includes reducing and preferably eliminating all ramp time violations of the integrated circuit. Timing optimization preferably minimizes the worst path delay. Area optimization preferably decreases the total cell area of the chip or local region.

Logic resynthesis can be accomplished, for example, by finding a chip design that has an identical logic function of an original chip design but has an improved characteristic, such as worst case propagation delay. The process of logic resynthesis can include many iterations and threads and can be applied to many different parts of the design. For example, an algorithm can be used to create a logic tree with a logic function identical to the logic function of an original logic tree. If the new logic tree has reduced propagation delays or eliminates a critical timing path, the new tree will replace the old tree. Resynthesis can also be applied to optimize the structure of large trees of buffers and inverters, and can be used to change the type and position of cells. Other procedures of local or global optimization can also be performed.

Zolotykh et al. U.S. Pat. No. 6,564,361 discloses a method for timing-driven resynthesis that can be used in accordance with one embodiment of the present invention. This method computes capacities and delays of an integrated circuit design, resynthesizes the design utilizing a plurality of local optimization procedures, and removes overlap. The local optimization procedures can include a local resynthesis of logic trees, which utilizes multiple cost functions, a dynamic buffer and inverter tree optimization procedure, and a cell resizing procedure. Generally, faster local optimization procedures are applied first, and slower, more thorough procedures are applied to areas where the faster procedures have not solved the optimization tasks.

In one embodiment of the present invention, timing-driven resynthesis is performed with a multi-threading parallel processing system, wherein each thread can run concurrently in a multi-threaded architecture, such as that disclosed in Zolotykh et al. U.S. Pat. No. 6,470,487. Parallelization is accomplished by use of a single main thread and a plurality of ordinal threads, for example. In one embodiment, parallelization is implemented for local optimization of clusters. Each ordinal thread preferably functions to optimize a cluster or a group of clusters, such that multiple clusters may be optimized concurrently to greatly expedite the time required for optimization.

Many of the resynthesizing steps described above can be performed prior to routing. Due to the large number of nets in a typical design, this restructuring can effect routing congestion in certain areas of the chip. This can complicate the routing process.

One embodiment of the present invention relates to a congestion control algorithm that estimates and controls future wire density. This algorithm includes three parts; initialization, modification processing and de-initiation, which are described below. However, the algorithm can include more parts or less parts in alternative embodiments.

3. Defining Congestion Rectangles

FIG. 1 is a diagram illustrating a design field 10 of an integrated circuit design. Design field 10 represents the area of the design that is being resynthesized. The design field could include the entire chip, but typically excludes areas in which certain "floor-planned" objects are pre-placed in the layout pattern. For example, with LSI Logic Corporation's RapidChip™ program, the designer is provided with a pre-built slice containing power and ground nets as well as aggregations of proven intellectual property.

The congestion control algorithm divides design field 10 into a plurality of non-overlapping columns 12 having a width 14 and a plurality of rows 16 having a height 18. The last column, for example, can be narrower than column_width. Also, the last row, for example, can be shorter than row_height.

Cells and other objects placed within design field 10 are interconnected to one another and to other objects on the integrated circuit through one or more conductive segments on one or more routing layers. The set of conductive segments that connect a pin of one object with one or more pins of another object is known as a "net" or "wire". Typically, all segments on one routing layer are parallel to one another and are perpendicular to the segments on an adjacent layer. The column width 14 and row height 16 can therefore represent the number of parallel routing lanes within each column or row.

Each technology has a minimum pitch between adjacent segments in a routing layer. As more wires are routed through a particular area of the integrated circuit, the more congested the routing lanes become.

Dividing design space 10 into columns 12 and rows 16 defines a plurality of congestion rectangles 20. Each congestion rectangle is an interception of one column 12 and one row 16 and can be used to analyze and control routing congestion within that rectangle.

Let Cnum be the number of columns 12 and Rnum be the number of rows 16. Then there are Cnum*Rnum congestion rectangles. As described below, for each congestion rectangle 20, the congestion algorithm maintains a corresponding congestion value, CongVal, which reflects routing congestion within that rectangle. These values are stored by the algorithm in memory as an array of doubles (having an array size Cnum*Rnum), called a congestion table.

4. Initialization of Algorithm Parameters and Congestion Tables

Figure 2:
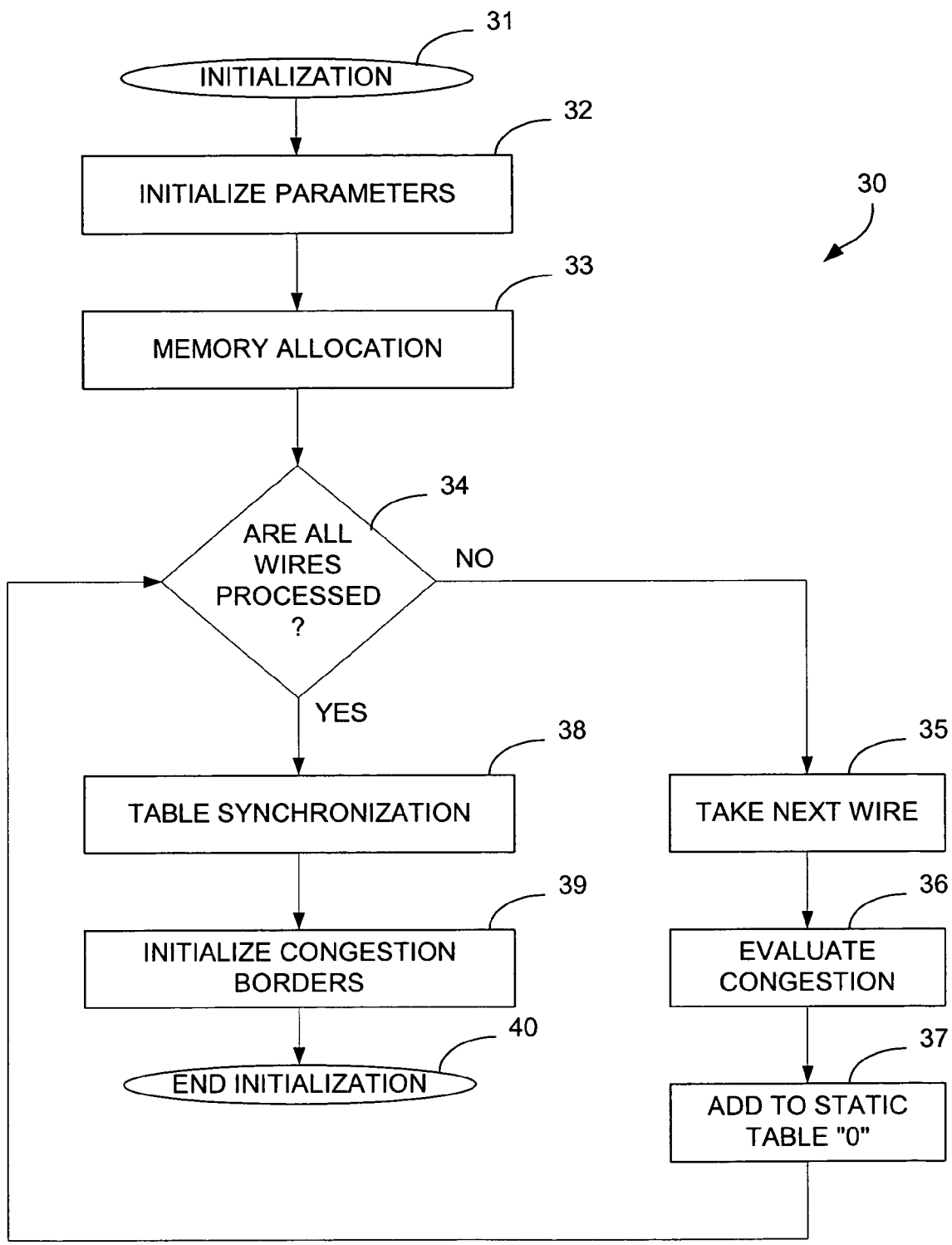
FIG. 2 is a diagram illustrating a process for initializing algorithm parameters and congestion tables according to one embodiment of the present invention.

FIG. 2 is a diagram illustrating a process 30 for initializing algorithm parameters and congestion tables according to one embodiment of the present invention.

Initialization begins at step 31 and includes two main steps: initialization of algorithm parameters at steps 32 and 39 and initialization of congestion tables at steps 34-38.

In one embodiment, the congestion control algorithm uses the following main parameters:
column_width,
row_height,
cong_border_1; and
cong_border_2.

The col_width and row_height parameters are used for defining the sizes of congestion tables. The cong_border_1 and cong_border_2 parameters are lower and upper congestion threshold values that are used during design modification processing, which is described in the next section.

a. Initialization of column_width and row-height

At step 32, the column_width and row_height parameters are initialized to values that implement a desired resolution at which congestion is analyzed. These values represent the width 14 of each column 12 and the height 18 of each row 14 in design field 10, and can be expressed in terms of distance or number of routing lanes, for example. The column_width and row_height values determine a compromise between accuracy and performance for the algorithm. The greater these values are, the faster the algorithm works. However, the resulting congestion estimates become less accurate. The smaller these values are, the slower the algorithm works but the congestion estimates become more accurate.

b. Initializing Congestion Tables

The congestion control algorithm maintains a plurality of congestion tables having sizes that are functions of column_width and row_height. The memory for the dynamic and static congestion tables is allocated at step 33 in FIG. 2.

In one embodiment, the congestion algorithm maintains a corresponding "dynamic" congestion table for each thread of the resynthesis program, such as the resynthesis program described in U.S. Pat. No. 6,470,487. These congestion tables represent congestion values for the dynamic design modifications currently being considered by the various threads. Each congestion value stored in a dynamic congestion table is therefore referred to as a "cur_value," since the value represents congestion of a current design modification being considered that thread.

There is also one "static" congestion table, which represents the congestion values for a "static design". The static design is the wire routing pattern for the design state after the latest design modifications have been accepted by the resynthesis program and prior to any current, dynamic modifications being considered by any thread. Each congestion value stored in the "static" table is therefore referred to as an "initial_value".

During memory allocation at step 33, all fields of the congestion tables are assigned initially to a zero value.

Then, all design nets are processed through steps 34-38 and correct congestion values for each congestion rectangle are assigned. Each CongVal in a table represents the level of congestion within the respective congestion rectangle 20 for the initial design. Initially, all tables have the same congestion values. A detailed description of wire processing is included in the next section.

Wire processing begins at step 34. If all wires have not been processed, the next wire is selected at step 35. For purposes of calculating the initial congestion values, each wire is viewed as a newly "added" wire. As described in more detail below, the algorithm defines a bounding rectangle that contains all pins of the wire, and calculates a congestion change value, ChVal, at step 36 that is added to the CongVal of each congestion rectangle contained in the bounding rectangle. Thus, each congestion rectangle has a CongVal that is initially a running sum of the change values of all wires that affect that congestion rectangle. As each wire is considered, the resulting ChVal is added to the affected congestion rectangles in the static table, at step 37.

Once all wires have been processed, all dynamic congestion tables are synchronized to contain the same congestion values as the static table, at step 38.

c. Initialization of Congestion Borders

The last action that is done during initialization is the determination of Cong_border_1 and Cong_border_2, at step 39. The upper border, Cong_border_2, is a product of the maximum value, $CongVal_{max}$, in the initial congestion tables (initially, all tables have the same values) and a constant. In one embodiment, this constant is typically greater than 1 and less than 1.5. Other values outside of this range can also be used in alternative embodiments. The purpose of the multiplication is to allow optimization of areas with high congestion values. The congestion algorithm assumes that at the beginning of the resynthesis process, congestion is insignificant.

Cong_border_1 is a product of Cong_border_2 and a constant that is typically greater than 0.5 and less than 0.8. However, other values outside of this range can be used in alternative embodiments of the present invention. This constant represents a low threshold of a desired congestion value, wherein congestion below Cong_border_1 is considered insignificant.

Cong_border_1 and Cong_border_2 can therefore be used by the control algorithm as upper and lower thresholds against which estimated congestion values can be compared.

5. Processing Design Modifications

Once the congestion tables and parameters have been initialized, these values can be used as optimization parameters by the resynthesis program. In one embodiment of the present invention, the congestion control algorithm processes estimated congestion values for each thread during design resynthesis, when limited or no routing information is available. As each design modification is being considered by a particular thread, the congestion control algorithm estimates the resulting change to the congestion values and calculates penalties for adding or removing a wire. The decision as to whether a design modification is accepted by the resynthesis program is described in Zolotykh et al. U.S. Pat. No. 6,564,361, for example.

As mentioned above, design resynthesis involves various transformations of the integrated circuit design. Examples of these transformations are disclosed in Zolotykh et al., U.S. Pat. No. 6,681,373, entitled "Method and Apparatus for Dynamic Buffer and Inverter Optimization," and Zolotykh et al., U.S. Pat. No. 6,543,032, entitled "Method and Apparatus for Local Resynthesis of Local Tress with Multiple Cost Functions," which can be used with one or more embodiments of the present invention.

From the point of view of congestion evaluation, these transformations can be generated by two local transformations—adding a new wire or removing an old wire. As each modification is considered by a thread, the congestion control algorithm estimates the resulting change to the congestion values of affected rectangles and calculates penalties for adding or removing the wire.

In one embodiment, the congestion algorithm processes design modifications in two parts. The first part is dynamic processing of adding or removing wire, which is done independently for every thread of the resynthesis program. The algorithm calculates a penalty for each wire change (adding or removing a wire) and (optionally) changes values of the thread's dynamic congestion table. The penalty can be used by the resynthesis program in its decision whether to accept a modification. For example, changes with huge penalty values are disallowed, and changes with small penalty values are preferred.

The second part of design modification processing is the synchronization and correction of congestion tables, which can be performed after a particular design modification (or an aggregate modification) is "accepted" by the resynthesis program. Synchronization and correction affects the "static" congestion table as well as all dynamic congestion tables. The idea here is that while searches for acceptable modifications are performed independently by each thread, synchronization of the congestion tables is performed after every accepted modification (or aggregate modification). In addition, in order to reduce the effect of error growth, the congestion tables are corrected regularly, as described in more detail below.

a. Dynamic Processing of Adding/Removing a Wire

Figure 3:
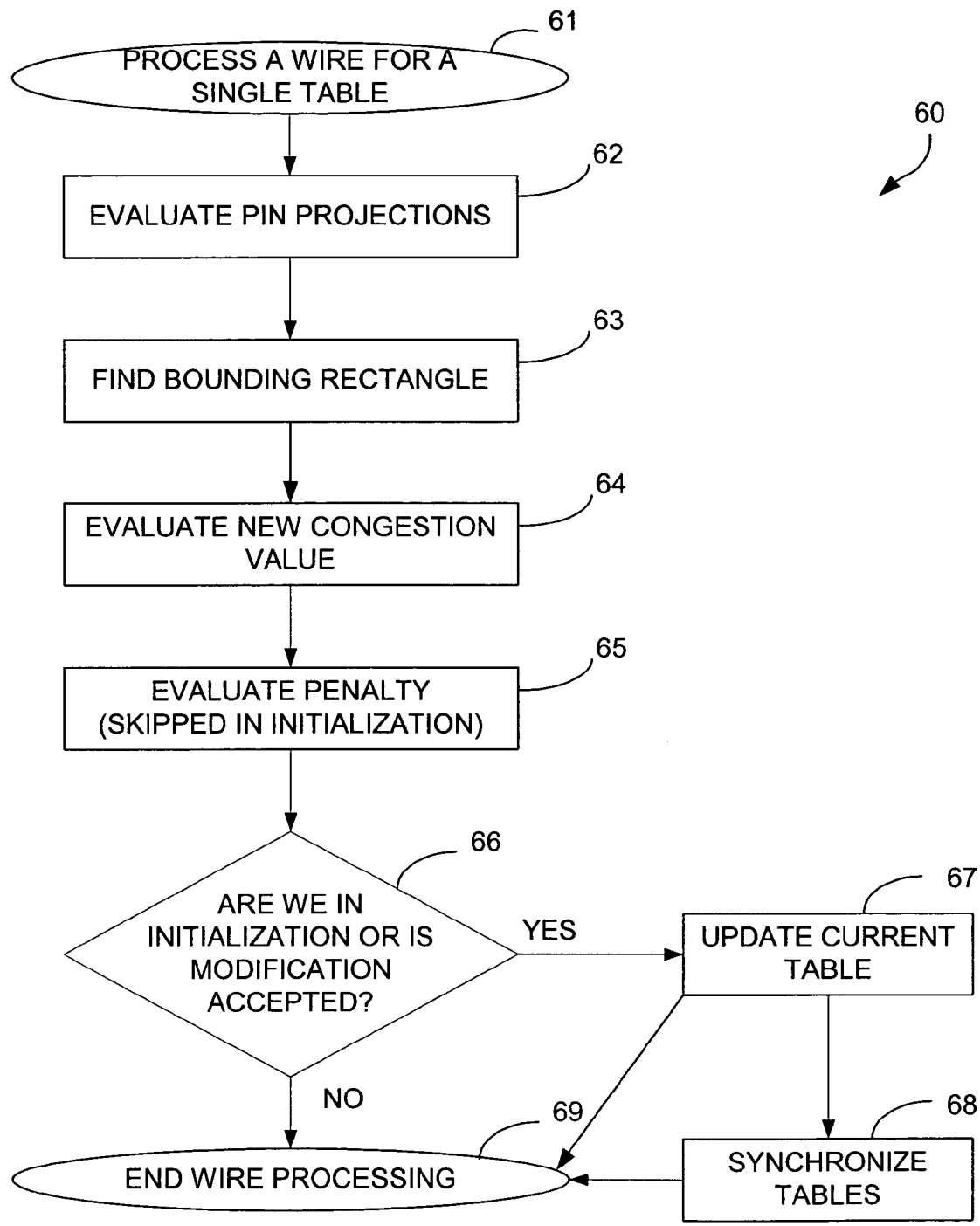
FIG. 3 is a flow chart illustrating a method of processing addition or removal of a wire for a single table.

FIG. 3 is a flow chart illustrating a method of processing the addition or removal of a wire for a single table.

The process begins at step 61. At step 62, all pins of the wire that do not lie within the design field are projected to the field. If a wire has a pin that is outside the field that is being resynthesised (e.g., outside design field 10 in FIG. 1), then for the purposes of computation, that pin is assumed to lie at the point at which the wire crosses the perimeter of the design field. For example, a wire originating within design field 10 may be routed to an I/O buffer that is outside field 10. For purposes of congestion evaluation, this wire is assumed to terminate at the perimeter of the design field.

At step 63, a bounding rectangle called "brect" is defined. The congestion algorithm defines brect as the minimal rectangle that satisfies the following properties:

A. the rectangle contains all pins of the wire (or pin projections for pins that do not lie in the design field); and
B. every congestion rectangle is either contained within a bounding rectangle or does not overlap with a bounding rectangle.

Figure 4:
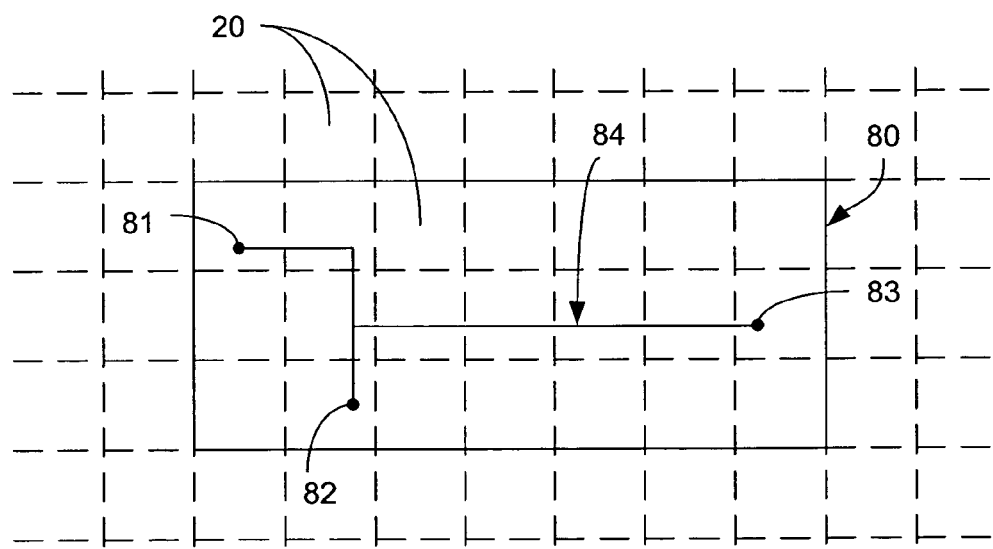
FIG. 4 illustrates and example of a bounding rectangle according to one embodiment of the present invention.

FIG. 4 illustrates an example of a bounding rectangle 80 according to one embodiment of the present invention. In this example, bounding rectangle 80 contains all three pins 81-83 of wire 84, and every congestion rectangle 20 (shown in dashed lines) is either contained in bounding rectangle 80 or does not overlap with the bounding rectangle. In other words, the perimeter of bounding rectangle 80 lies on the perimeters of the congestion rectangles 20 that are contained within the bounding rectangle.

Although wire 84 has not yet been routed along any particular routing channels or layers between pins 81-83, it is assumed for the purposes of estimating congestion that the addition or removal of wire 84 affects congestion of all congestion rectangles contained within bounding rectangle 80.

Referring back to FIG. 3, the congestion control algorithm approximates a congestion change value, ChVal, for the congestion rectangles contained within the bounding rectangle (such as bounding rectangle 80 in FIG. 4). The change value ChVal is approximated according to the following equation:

$$ChVal = Prob(num) * Sale(brect)$$

where num is the number of pins in the wire, brect is the bounding rectangle, and Prob and Scale are functions constructed according to physics and congestion statistics.

In one embodiment, Scale(brect) equals 1/brect_width+1/brect_height, where brect_width is measured in congestion columns and brect_height is measured in congestion rows. Prob(num) is defined by a table for small values of num and is nearly linear for large values of num. More precisely, Prob (num) is equal to ProbTable[num] if num is less than a certain threshold, and Prob(num) is equal to "a*num+b*sqrt(num)+c," where ProbTable values and the values of a, b and c are evaluated on the basis of statistical data (congestion density of real design wires with given number of pins). The functions Prob and Scale are the same for all designs of a particular technology. Other relationships can also be used to approximate an appropriate change value ChVal in alternative embodiments of the present invention.

Next, at step 65, a penalty for adding or removing the wire is calculated for the dynamic thread. This step is skipped during initialization. The congestion control algorithm calculates a penalty for each congestion rectangle that is affected by the wire change (each congestion rectangle contained in the bounding rectangle) based on the congestion change value ChVal. The overall penalty for the wire change is the sum of these individual penalties.

The penalty for changing one congestion value within the bounding rectangle is a function with the following arguments: initial_value, cur_value and new_value. The initial_value is the corresponding congestion value after the previously-accepted design modification or after initialization if no modifications were accepted. The cur_value is the current congestion value for the congestion rectangle, i.e., the congestion value of the congestion rectangle for the current dynamic thread. These values may be different as some intermediate design changes could be performed in the dynamic thread after the last accepted modification. The new_value is equal to cur_value+ChVal if the wire is added as a new wire or is equal to cur_value−ChVal if the wire is removed. Wire transformation is modeled by a pair (remove, add).

The change value ChVal therefore represents a constant that is added to or subtracted from the current congestion value of each congestion rectangle within the bounding rectangle when a wire is added or removed from the bounding rectangle. ChVal is the same for each congestion rectangle in the bounding rectangle. Since, ChVal is based on a number of pins in the wire and the size of the bounding rectangle, it is calculated separately for each wire change.

FIG. 5 is a diagram illustrating pseudocode for calculating the penalty when a new wire is added. The penalty is calculated for each congestion rectangle within the bounding rectangle that contains the newly added wire. Each congestion rectangle can have a different penalty value depending on the initial_value and the cur_value of that rectangle prior to the new wire. As can be seen in FIG. 5, the new_value is compared to the thresholds Cong_border_1 and Cong_border_2 and with the initial_value to determine an appropriate penalty to be associated with that congestion rectangle for the addition of the new wire.

The cong_efficiency_multiplier is a constant that is typically greater than or equal to 5, and cong_worst_penalty is a constant with a huge value. The idea is that congestion values less than Cong_border_1 are not essential, congestion values greater than Cong_border_2 are not allowed, and increasing initial_value is penalized greater than just increasing cur_value.

FIG. 5 is simply an example of one algorithm for calculating a corresponding penalty that can be used in accordance with one embodiment of the present invention. Other methods of calculating a suitable penalty can also be used in accordance with alternative embodiments of the present invention, and each penalty can be based on different variables than those shown in FIG. 5.

FIG. 6 is a diagram illustrating pseudocode for an algorithm used to calculate the penalty for removing a wire. This algorithm is similar to the algorithm shown in FIG. 5 for adding a wire. Again, any suitable algorithm for calculating an appropriate penalty for removing a wire can be used in alternative embodiments of the present invention.

Referring back to FIG. 3, once the penalties have been calculated for the affected congestion rectangles, these values can be used by the resynthesis program in its decision to accept or reject the current design modification. If, at step 66, the congestion algorithm determines that the resynthesis program has accepted the current design modification or if the congestion algorithm is in initialization (FIG. 2), the algorithm proceeds to step 67, where the current table is updated. If the algorithm is in initialization, the static congestion table is updated according to step 37 in FIG. 2. If the algorithm is not in initialization, the corresponding dynamic congestion table is updated by replacing the "cur_value" with the "new_value" for the congestion rectangles affected by the accepted wire change.

All congestion tables are then synchronized at step 68, and the processing of the current wire change terminates at step 69. Synchronization is described in more detail in the next subsection.

However, some accepted design modifications do not lead to synchronization at step 68. With these modifications, the algorithm proceeds directly from step 67 to step 69. The reason is that a design modification sometimes includes several intermediate (sub) modifications. For example, a modification that leads to the merging two wires may consist of three (sub) modifications: delete a first wire, delete a second wire, and add the result of merging. A modification that inserts a buffer chain may include the following (sub) modifications: add a first buffer, add a next buffer, tune the position and the type of the first buffer, etc. A decision on acceptance is performed for every (sub) modification. If a (sub) modification is accepted, the corresponding dynamic congestion table is changed. However, synchronization is performed only after the acceptance of the aggregate (compound) modification. This is why the cur_values and initial_values may be different from one another.

If, at step 66, the congestion algorithm is not in initialization and the current wire change is rejected by the resynthesis algorithm, the congestion tables are not updated, and the processing of the current wire change terminates at step 69.

b. Synchronization and Correction of Congestion Tables

1. Synchronization

Synchronization of the dynamic and static congestion tables is performed as follows. After the resynthesis program accepts a modification (or an aggregate modification), the resynthesis threads are synchronized. During this process, the actual congestion values (the values of the thread that found the acceptable modification) are updated if necessary. The dynamic congestion table for that thread may have some congestion rectangles that have new actual values ("new_value") and some that are unchanged since they are unaffected by the wire change. The congestion rectangles that have changed congestion values, calculated in step 64 of FIG. 3, are stored at the appropriate locations in the dynamic congestion table.

Initial values, i.e. values after the previously accepted modification or after initialization if no modification were accepted, are taken from the "static" congestion table. In many implementations, design resynthesis is performed as follows. At first a modification is chosen from a number of standard modifications, and then this modification is applied (and the process is repeated). Modification choice is based on the modification "qualities", and these qualities are evaluated by threads. During modification quality evaluation (i.e., during the modification choice) some calculations are approximated in order to speed execution. If some rough approximations connected with the congestion tables were done (e.g., a dynamic congestion table was not changed after removing a wire and adding a similar but not the same wire), correct recalculation is performed when the modification is selected and applied. If no back-change of congestion table was performed in the thread, the dynamic congestion table at this point contains "approximate" "new" congestion values, and initial congestion values are needed for a correct update. In this case the values from the static congestion table are used.

Then, the actual congestion values of the dynamic congestion table are assigned to all other tables including the "static" table. These values then become the new "initial" values.

2. Correction

The congestion changing value calculation is approximate. For example, adding wires W1 and W2 and adding a wire W that is the result of merging W1 and W2 may cause different changes. In order to avoid error growth, the congestion values are corrected (recalculated) regularly. For example, correction can be performed at each synch_freq-th synchronization, where synch_freq is a constant with a suitable value such as 100 or 500. In one embodiment, correction could therefore be performed at every 100th synchronization.

Correction is similar to initialization and is performed in the following way. All congestion values of the "static" table and the dynamic tables are set to zero and then all wires of the current design version are added and processed according to steps 34-38 of FIG. 2.

Figure 7:
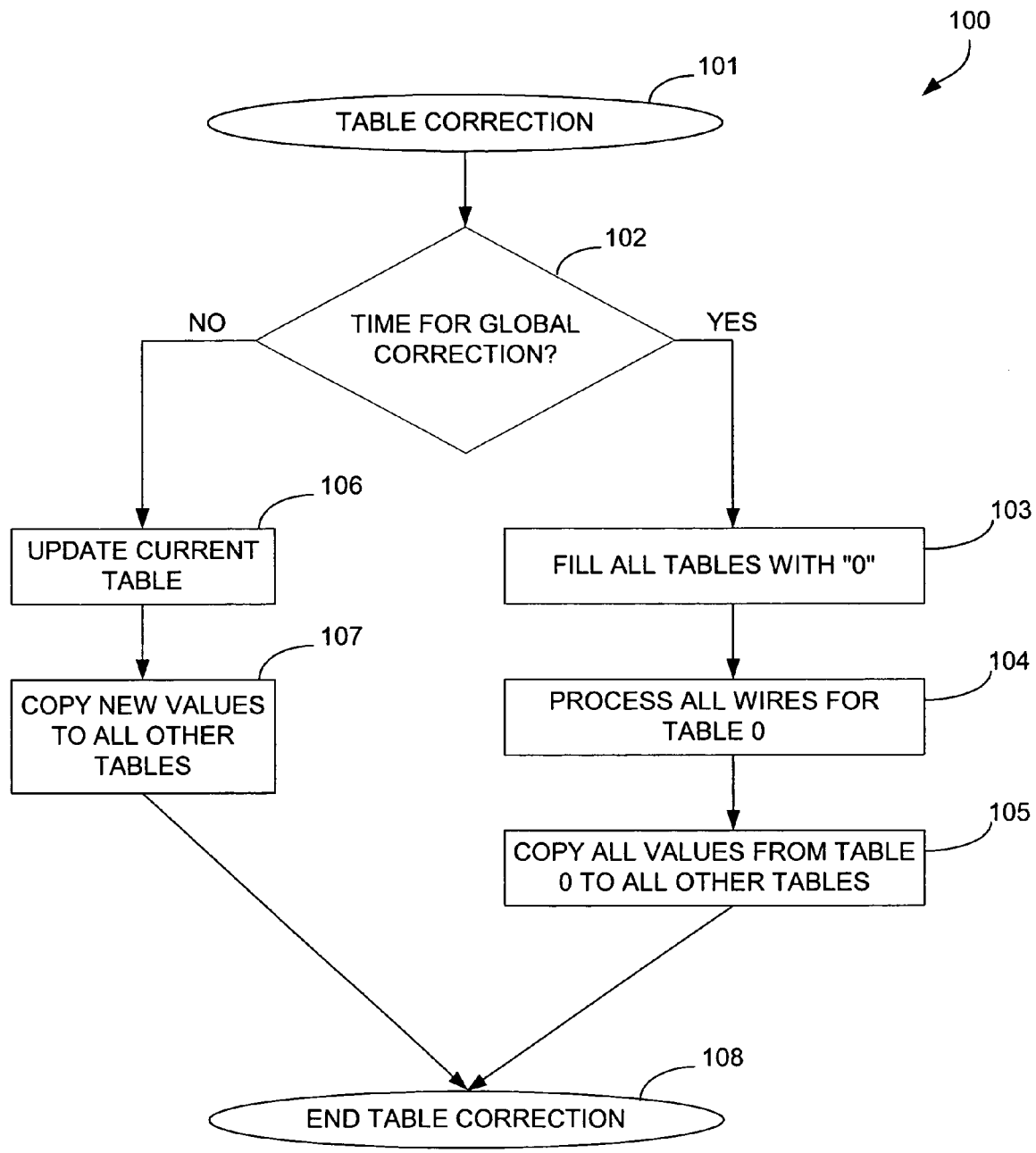
FIG. 7 is a diagram illustrating a flow chart of a table correction algorithm according to one embodiment of the present invention.

FIG. 7 is a diagram illustrating a flow chart of a table correction algorithm 100 according to one embodiment of the present invention. Table correction begins at step 101. At step 102 the algorithm determines whether it is time for a global correction. If so, all tables (static and dynamic) are filled with congestion values equal to zero, at step 103. At step 104, all wires are processed for the static congestion table according to the initialization algorithm shown in FIG. 2. At step 105, all congestion values from the static congestion table are copied to all other tables and the table correction algorithm ends at step 108.

If, at step 102, it is not time for a global correction, a normal table update is performed at step 106, and the new values of the current table are copied to all other tables at step 107. Steps 106 and 107 correspond to steps 67 and 68 in FIG. 3.

6. Congestion Tables De-Initialization

After the design resynthesis program has completed, the memory that is occupied by the static and dynamic congestion tables is freed.

7. Hardware Environment for Implementing the Congestion Control Algorithm

Figure 8:
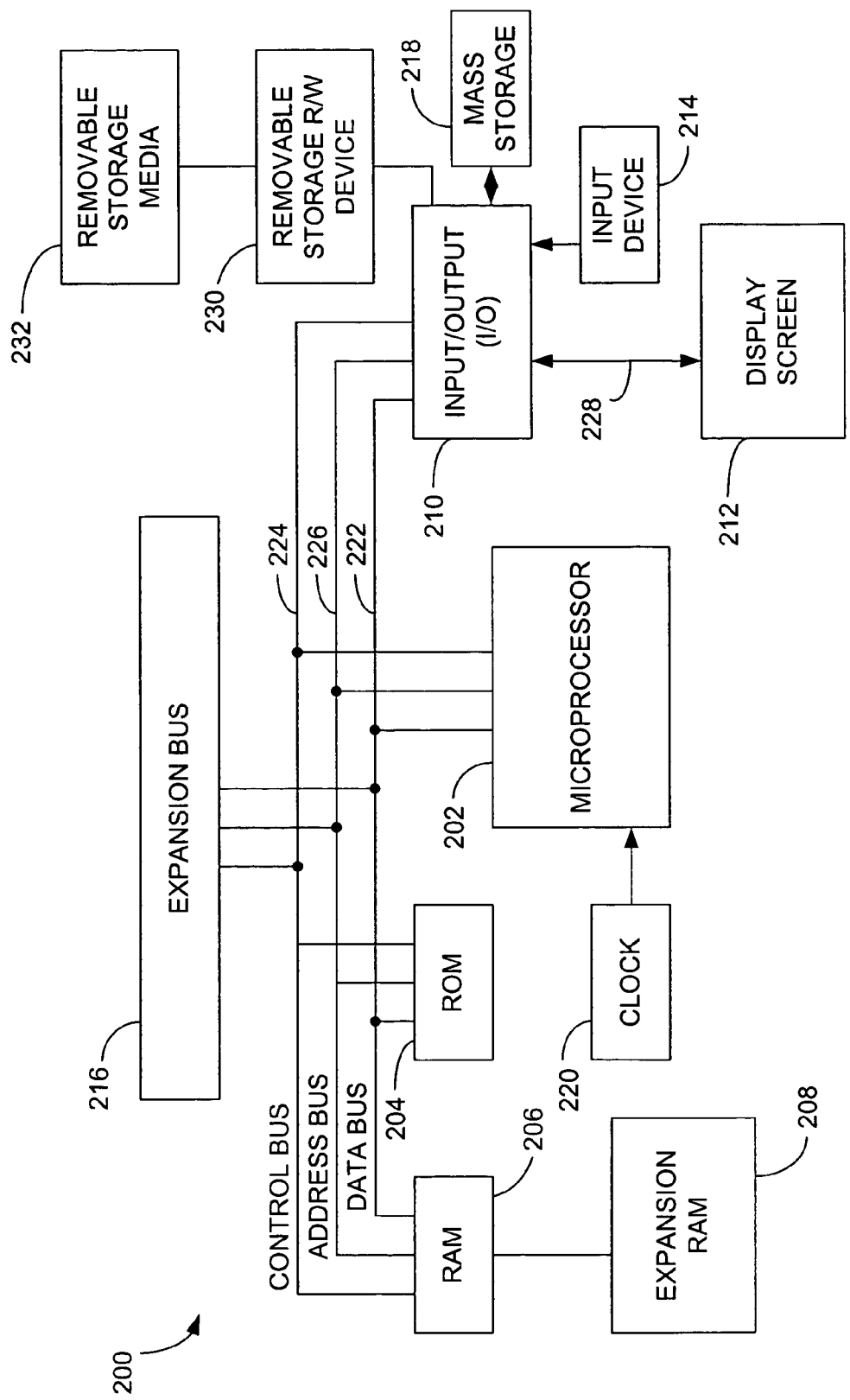
FIG. 8 is a block diagram of a general purpose computer system, representing an example of a hardware environment for executing one or more steps of the algorithms shown in FIGS. 2-6.

FIG. 8 is an illustration of a general purpose computer system 200, representing one of many suitable hardware environments for implementing or executing one or more steps of one or more of the algorithms described above. Although not required, an embodiment of the invention is described in the general context of computer-executable instructions, such as program modules, being executed by a computer, such as a personal computer. Generally, program modules include routines, programs, objects, components, data structures, etc., that perform particular tasks or implement particular abstract data types.

Computer system 200 includes a central processing unit (CPU) 202, read only memory (ROM) 204, random access memory (RAM) 206, expansion RAM 208, input/output (I/O) circuitry 210, display assembly 212, input device 214, and expansion bus 216. Computer system 200 may also include a mass storage unit 218 such as a disk drive unit or nonvolatile memory such as flash memory and a clock 220.

CPU 202 is coupled to ROM 204, RAM 206, I/O circuitry 210 and expansion bus 216 by a databus 222, control bus 224, and address bus 226. ROM 204 comprises the basic operating system for the computer system 200.

I/O circuitry 210 typically includes a number of latches, registers and direct memory access (DMA) controllers. The purpose of I/O circuitry 210 is to provide an interface between CPU 202 and such peripheral devices as display assembly 212, input device 214, and mass storage 218.

Display assembly 212 is an output device coupled to I/O circuitry 210 by a data bus 228. Display assembly 212 receives data from I/O circuitry 212 via bus 228 and displays that data on a suitable screen. The screen for display assembly 212 can be a device that uses a cathode-ray tube (CRT), liquid crystal display (LCD), or the like, of the types commercially available from a variety of manufacturers. Input device 214 can be a keyboard, a mouse, a trackball, a stylus working in cooperation with a position-sensing display, or any other device for interacting with computer system 200.

For example, information can be inputted into the computer system 200 by typing on a keyboard, manipulating a mouse or trackball, or "writing" on a tablet or on position-sensing screen of display assembly 212. CPU 202 then processes the data under control of an operating system and an application program stored in ROM 204 and/or RAM 206. CPU 202 then typically produces data, which is outputted to the display assembly 212 and/or to one or more files stored in one or more of the various memory devices coupled to system 200 either directly or through or a network interface.

Expansion bus 216 is coupled to data bus 222, control bus 224, and address bus 226 to provide extra ports to couple devices such as network interface circuits, modems, display switches, microphones, speakers, etc. to CPU 202. Network communication is accomplished through the network interface circuit and an appropriate network.

Mass storage 218 can include any suitable memory type, such as a commercially available hard disk drive, flash memory, etc. In addition, computer system 200 can include a removable storage read/write device 230 to read from and/or to write to a removable storage media 232. Removable storage media 232 can comprise any type of computer-readable media which can store data that is accessible by a computer. Instructions for implementing the inventive method may be provided, in one embodiment, to a network via such a removable storage media.

Suitable computers for use in implementing the present invention may be obtained from various vendors. Various computers, however, may be used depending upon the size and complexity of the optimization tasks. Suitable computers include mainframe computers, multiprocessor computers, workstations, personal computers or hand-held devices, for example. Elements of the invention may also be practiced in distributed computing environments where tasks are performed by remote devices coupled through a communications network. Program modules may be located in both local and remote memory devices.

A person of ordinary skill in the art can therefore implement one or more of the processes or process steps described in the above-description and/or drawings as processor executable instructions, which can be stored on any form of a computer readable media. Computer readable mediums can be any available media that can be accessed by computer system 200 and includes volatile media, nonvolatile media, removable media and non-removable media. Examples of such media include, but are not limited to, RAM, ROM, EEPROM, PCMCIA cards, flash memory or other memory technology, CD-ROM, digital versatile disks (DVD) or other optical disk storage, magnetic cassettes, magnetic tape, magnetic disk storage or any other medium that can be accessed by computer system 200. Elements of the invention can be stored on the media as computer readable instructions, data structures, program modules or other data, for example.

The present invention has now been described with reference to several embodiments. The foregoing detailed description and examples have been given for clarity of understanding only. Those skilled in the art will recognize that many changes can be made in the described embodiments without departing from the scope of the invention.

What is claimed is:

1. A method implemented at least in part by a computing device and with a design resynthesis process, which comprises a plurality of threads for analyzing logic transformations in the design field, comprising:
   (a) dividing an integrated circuit design field into a plurality of congestion rectangles;
   (b) estimating a routing congestion value for each congestion rectangle prior to routing interconnections within the design field;
   (c) storing the congestion values in machine-readable memory, including:
      storing static routing congestion values for each congestion rectangle in a static congestion table; and
      for each thread, storing dynamic routing congestion values for each congestion rectangle in a dynamic congestion table; and
   (d) updating the routing congestion values in response to wire changes within the design field.

2. The method of claim 1 wherein step (a) comprises:
   (a)(1) inputting a column width and a row height through a user input; and
   (a)(2) dividing the integrated circuit design field into columns and rows having the column width and the row height, wherein each intersection of one row and one column defines one of the congestion rectangles.

3. The method of claim 1 wherein the method is implemented in a parallel dynamic resynthesis process, which processes the plurality of threads in parallel.

4. The method of claim 1 wherein step (b) comprises:
(b)(1) initializing the congestion value for each congestion rectangle to an initial value;
(b)(2) for each wire in the design field:
defining a bounding rectangle, which contains all pins within the design field, or projections of pins into the design field, that are connected to the wire;
approximating a change value for the congestion rectangles within the bounding rectangle due to the wire; and
updating the initial value by the change value; and
(b)(3) repeating step (b)(2) for each remaining wire in the design field.

5. The method of claim 4 wherein defining a bounding rectangle in step (b)(2) comprises defining a minimal bounding rectangle, which contains all pins within the design field, or projections of pins into the design field, that are connected to the wire, and such that every congestion rectangle is either contained within the bounding rectangle or does not overlap with the bounding rectangle.

6. The method of claim 1 wherein step (d) comprises, for each wire change:
(d)(1) defining a bounding rectangle, which contains all pins within the design field, or projections of pins into the design field, that are connected to the wire that is changed;
(d)(2) approximating a change value for the congestion rectangles within the bounding rectangle due to addition or removal of the wire that is changed; and
(d)(3) updating the congestion values of the congestion rectangles within the bounding rectangle defined in (d)(1) according to the change value.

7. The method of claim 6 and further comprising:
(e) periodically correcting the congestion values after at least one iteration of step (d) by:
(e)(1) initializing the congestion value for each congestion rectangle to an initial value;
(e)(2) for each wire in the design field:
defining a bounding rectangle, which contains all pins within the design field, or projections of pins into the design field, that are connected to the wire;
approximating a change value for the congestion rectangles within the bounding rectangle due to addition of the wire to the design field; and
updating the initial value according to the change value; and
(e)(3) repeating step (e)(2) for each remaining wire in the design field.

8. The method of claim 1 wherein:
step (d) comprises, for a wire change identified by one of the threads:
(d)(1) evaluating new congestion values for the congestion rectangles that are affected by the wire change;
(d)(2) if the wire change is accepted by the resynthesis process, updating the congestion values of the congestion rectangles that are affected by the wire change to the new congestion values; and
(d)(3) synchronizing the remaining dynamic congestion tables and the static congestion table to the dynamic congestion table of that thread.

9. The method of claim 8 wherein step (d) further comprises, for the wire change:

(d)(4) calculating a penalty for making the wire change and providing the penalty to the resynthesis process.

10. A computer-readable medium having computer-executable instructions for performing steps comprising:
(a) dividing an integrated circuit design field into a plurality of congestion rectangles;
(b) estimating a routing congestion value for each congestion rectangle prior to routing interconnections within the design field;
(c) storing the congestion values in machine-readable memory; and
(d) updating the routing congestion values in response to wire changes within the design field, including: for each wire change:
(d)(1) defining a bounding rectangle, which contains all pins within the design field, or projections of pins into the design field, that are connected to the wire that is changed;
(d)(2) approximating a change value for the congestion rectangles within the bounding rectangle due to addition or removal of the wire that is changed; and
(d)(3) updating the congestion values of the congestion rectangles within the bounding rectangle defined in (d)(1) according to the change value.

11. The computer-readable medium of claim 10 wherein step (a) comprises:
(a)(1) receiving a column width and a row height through a user input; and
(a)(2) dividing the integrated circuit design field into columns and rows having the column width and the row height, wherein each intersection of one row and one column defines one of the congestion rectangles.

12. The computer-readable medium of claim 10 wherein step (c) comprises storing the congestion values in a congestion table.

13. The computer-readable medium of claim 10 wherein The computer-readable medium is implemented with a design resynthesis process, which comprises at least one thread for analyzing a logic transformation in the design field, and wherein step (c) comprises:
storing static routing congestion values for each congestion rectangle in a static congestion table; and
for each logic transformation thread in a parallel dynamic resynthesis process, storing dynamic routing congestion values for each congestion rectangle in a dynamic congestion table.

14. The computer-readable medium of claim 10 wherein step (b) comprises:
(b)(1) initializing the congestion value for each congestion rectangle to an initial value;
(b)(2) for each wire in the design field:
defining a bounding rectangle, which contains all pins within the design field, or projections of pins into the design field, that are connected to the wire;
approximating a change value for the congestion rectangles within the bounding rectangle due to the wire; and
updating the initial value by the change value; and
(b)(3) repeating step (b)(2) for each remaining wire in the design field.

15. The computer-readable medium of claim 14 wherein defining a bounding rectangle in step (b)(2) comprises defining a minimal bounding rectangle, which contains all pins within the design field, or projections of pins into the design field, that are connected to the wire, and such that every congestion rectangle is either contained within the bounding rectangle or does not overlap with the bounding rectangle.

16. The computer-readable medium of claim 10 wherein:

step (c) comprises storing the congestion values for each congestion rectangle in a static congestion table and, for each thread in a dynamic logic resynthesis process, storing the congestion values in a corresponding dynamic congestion table; and step (d) comprises, for a wire change identified by one of the threads:

- (d)(1) evaluating new congestion values for the congestion rectangles that are affected by the wire change;
- (d)(2) if the wire change is accepted by the resynthesis process, updating the congestion values of the congestion rectangles that are affected by the wire change to the new congestion values; and
- (d)(3) synchronizing the remaining dynamic congestion tables and the static congestion table to the dynamic congestion table of that thread.

17. An apparatus comprising:

a static congestion table stored on a computer-readable medium and comprising an estimated initial routing congestion value for each congestion rectangle of an integrated circuit design field, prior to routing; and a dynamic congestion table for each logic transformation thread of a multi-threaded resynthesis process, wherein each dynamic congestion table is stored on a computer-readable medium and comprises an estimated dynamic routing congestion value for each of the congestion rectangles, prior to routing.

* * * * *